United States Patent
Jain et al.

(10) Patent No.: US 10,089,194 B2
(45) Date of Patent: Oct. 2, 2018

(54) SYSTEM AND METHOD FOR FALSE PASS DETECTION IN LOCKSTEP DUAL CORE OR TRIPLE MODULAR REDUNDANCY (TMR) SYSTEMS

(71) Applicant: QUALCOMM Incorporated, San Diego, CA (US)

(72) Inventors: Palkesh Jain, Bangalore (IN); Virendra Bansal, Bangalore (IN); Rahul Gulati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 15/176,745

(22) Filed: Jun. 8, 2016

(65) Prior Publication Data
US 2017/0357557 A1 Dec. 14, 2017

(51) Int. Cl.
G06F 11/00 (2006.01)
G06F 11/16 (2006.01)
G06F 11/18 (2006.01)

(52) U.S. Cl.
CPC ...... *G06F 11/1608* (2013.01); *G06F 11/1604* (2013.01); *G06F 11/1641* (2013.01);
(Continued)

(58) Field of Classification Search
CPC ............ G06F 11/1604; G06F 11/1608; G06F 2201/805; G06F 2201/82
See application file for complete search history.

(56) References Cited

U.S. PATENT DOCUMENTS 5,226,152 A * 7/1993 Klug ............... G06F 9/3851
714/12
5,233,615 A * 8/1993 Goetz ............... G06F 11/184
714/12
(Continued)

FOREIGN PATENT DOCUMENTS

EP 2221723 A1 8/2010
WO WO-2007005818 A2 1/2007

OTHER PUBLICATIONS

International Search Report and Written Opinion—PCT/US2017/031542—ISA/EPO—dated Jul. 25, 2017.

*Primary Examiner* — Joshua P Lottich
(74) *Attorney, Agent, or Firm* — Loza & Loza, LLP/Qualcomm

(57) ABSTRACT

The disclosure relates to an apparatus and method for false pass detection in lockstep dual processing core systems, triple modular redundancy (TMR) systems, or other redundant processing systems. A false pass occurs when two processing cores generate matching data outputs, both of which are in error. A false pass may occur when the processing core are both subjected to substantially the same adverse condition, such as a supply voltage drop or a sudden temperature change or gradient. The apparatus includes processing cores configured to generate first and second data outputs and first and second timing violation signals. A voter-comparator validates the first and second data outputs if they match and the first and second timing violation signals indicate no timing violations. Otherwise, the voter comparator invalidates the first and second data outputs. Validated data outputs are used for performing additional operations, and invalidated data outputs may be discarded.

23 Claims, 7 Drawing Sheets

(52) U.S. Cl.
CPC .......... *G06F 11/184* (2013.01); *G06F 11/187* (2013.01); *G06F 2201/805* (2013.01); *G06F 2201/82* (2013.01)

(56) References Cited

U.S. PATENT DOCUMENTS

| | | | | |
|---|---|---|---|---|
| 5,295,258 | A * | 3/1994 | Jewett | G06F 1/12 714/12 |
| 5,398,331 | A * | 3/1995 | Huang | G06F 11/1633 714/12 |
| 5,630,056 | A * | 5/1997 | Horvath | G06F 11/1625 714/11 |
| 5,845,060 | A * | 12/1998 | Vrba | G06F 11/1683 375/356 |
| 5,890,003 | A * | 3/1999 | Cutts, Jr. | G06F 9/52 710/263 |
| 6,247,143 | B1 * | 6/2001 | Williams | G06F 9/52 714/11 |
| 7,969,216 | B2 | 6/2011 | Dennis et al. | |
| 9,047,184 | B2 | 6/2015 | Bull et al. | |
| 9,122,891 | B2 | 9/2015 | Fuller | |
| 9,235,673 | B2 | 1/2016 | Grinshpon et al. | |
| 2005/0268263 | A1 | 12/2005 | Sun | |
| 2007/0162798 | A1 * | 7/2007 | Das | G06F 11/0721 714/724 |
| 2008/0250185 | A1 * | 10/2008 | Clark | G06F 1/04 710/306 |
| 2010/0115245 | A1 | 5/2010 | Okazaki | |
| 2012/0030519 | A1 | 2/2012 | Wilt et al. | |
| 2012/0066551 | A1 * | 3/2012 | Palus | G06F 11/28 714/39 |
| 2017/0344438 | A1 * | 11/2017 | Bilgiday | G06F 11/1469 |

\* cited by examiner

SYSTEM AND METHOD FOR FALSE PASS DETECTION IN LOCKSTEP DUAL CORE OR TRIPLE MODULAR REDUNDANCY (TMR) SYSTEMS

BACKGROUND

Field

Aspects of the present disclosure relate generally to redundant processor systems, and in particular, to a system and method for false pass detection in lockstep dual core or triple modular redundancy (TMR) systems.

Background

Electronic systems used in applications dealing with the safety of people are often subjected to more stringent design requirements. For example, in the automotive industry, the International Organization of Standardization (ISO) has issued a functional safety standard ISO 26262, entitled "Road Vehicles—Functional Safety" that provides many requirements for automotive electronic systems for reducing the likelihood of injury to people and damage to property as a result of a defective or not-properly designed product.

In such electronic systems, redundant processing cores are often employed to generate concurrent data outputs in response to lockstep instructions. If the data outputs match, then such electronic systems validate the data. If the data outputs do not match, such electronic systems invalidate the data.

However, there may be situations where the redundant processing cores generate matching data outputs, which are both in error. Such condition is termed as a false pass. That is, the matching data, albeit in error, are then used for performing the intended operation of the corresponding electronic system. Such data in error may have severe adverse consequence, especially if the electronic system is employed for the safety of people and protection of property.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus including a first processing core configured to generate a first data output and a first timing violation signal in response to executing one of a set of lockstep instructions; a second processing core configured to generate a second data output and a second timing violation signal in response to executing another one of the set of lockstep instructions; and a voter-comparator configured to validate the first and second data outputs in response to the first data output matching the second data output, and the first and second timing violations signals indicating no timing violation.

Another aspect of the disclosure relates to a method including generating a first data output and a first timing violation signal in response to executing a first lockstep instruction; generating a second data output and a second timing violation signal in response to executing the first lockstep instruction; and validating the first and second data outputs in response to the first data output matching the second data output, and the first and second timing violations signals indicating no timing violation.

Another aspect of the disclosure relates to an apparatus including means for generating a first data output and a first timing violation signal in response to executing one of a set of lockstep instructions; means for generating a second data output and a second timing violation signal in response to executing another one of the set of lockstep instructions; and means for validating the first and second data outputs in response to the first data output matching the second data output, and the first and second timing violations signals indicating no timing violation.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Electronic systems used in applications dealing with the safety of people are often subjected to more stringent design requirements. For example, in the automotive industry, the International Organization of Standardization (ISO) has issued a functional safety standard ISO 26262, entitled "Road Vehicles—Functional Safety" that provides many requirements for automotive electronic systems for reducing the likelihood of injury to people and damage to property as a result of a defective or not-properly designed product.

One such requirement, specifically directed to data processing cores, is the maximum number of output data errors per number of instructions that may be tolerated. To address such requirement, many designers have designed automotive electronic systems to include multiple processing cores (sometimes referred to as redundant processors) or other devices that detect errors in the output data of data processing cores. These systems are referred to as lockstep dual core or triple modular redundancy (TMR) systems.

Figure 1A:
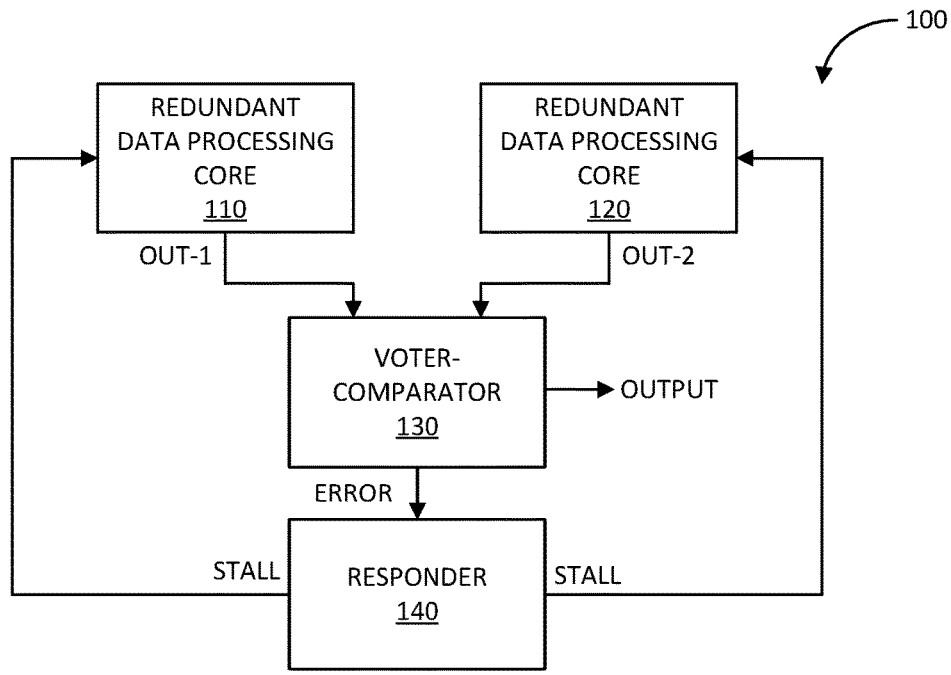
FIG. 1A illustrates a block diagram of an exemplary lockstep dual core processing system in accordance with an aspect of the disclosure.

FIG. 1A illustrates a block diagram of an exemplary lockstep dual core system 100 in accordance with an aspect of the disclosure. The system 100 includes a pair of redundant data processing cores 110 and 120 for performing one or more redundant operations, which may have an impact on human safety and destruction of property. The data processing cores 110 and 120 generate data outputs OUT-1 and OUT-2 based on one or more executed lockstep instructions, respectively. Lockstep instructions need not be executed simultaneously (although they could), but are executed in a manner intended to produce matching data outputs at the cores for comparison purposes.

The system 100 also includes a voter-comparator 130 configured to compare the data outputs OUT-1 and OUT-2 from the redundant data processing cores 110 and 120, respectively. If the data outputs OUT-1 and OUT-2 match (e.g., both have the same digital value), the voter-comparator 130 validates the data outputs OUT-1 and OUT-2 (considers them correct or reliable), and outputs either one of them for use by another component (not shown) of the system. The voter-comparator 130 also generates or maintains an ERROR signal deasserted. In this case, it is assumed that the data processing cores 110 and 120 are operating properly if their respective data outputs OUT-1 and OUT-2 match.

If, on the other hand, the data outputs OUT-1 and OUT-2 of the redundant data processing cores 110 and 120 do not match, the voter-comparator 130 invalidates the data outputs (considers them incorrect or unreliable), and suppresses the outputting of any one of them. Additionally, the voter-comparator 130 generates or asserts an ERROR signal. The voter-comparator 130 may maintain as its output the previous correct (non-error) data output OUT-1 or OUT-2 resulting from a prior lockstep instruction. In this case, it is assumed that the data processing cores 110 and 120 are not operating properly if their respective data outputs OUT-1 and OUT-2 do not match.

The system 100 further includes a responder 140 configured to perform one or more operations in response to the error signal ERROR being asserted (and may not perform any operation in response to the error signal ERROR not being asserted (e.g., in a deasserted state)). As an example, the responder 140 may generate or assert a stall command signal STALL in response to the error signal ERROR being asserted. In response to the asserted stall signal STALL, the data processing cores 110 and 120 stall their respective operations and roll back their respective configurations (e.g., previous executed lockstep instructions and data outputs OUT-1 and OUT-2) to the states prior to execution of the lockstep instructions that resulted in the asserted error signal ERROR.

Figure 1B:
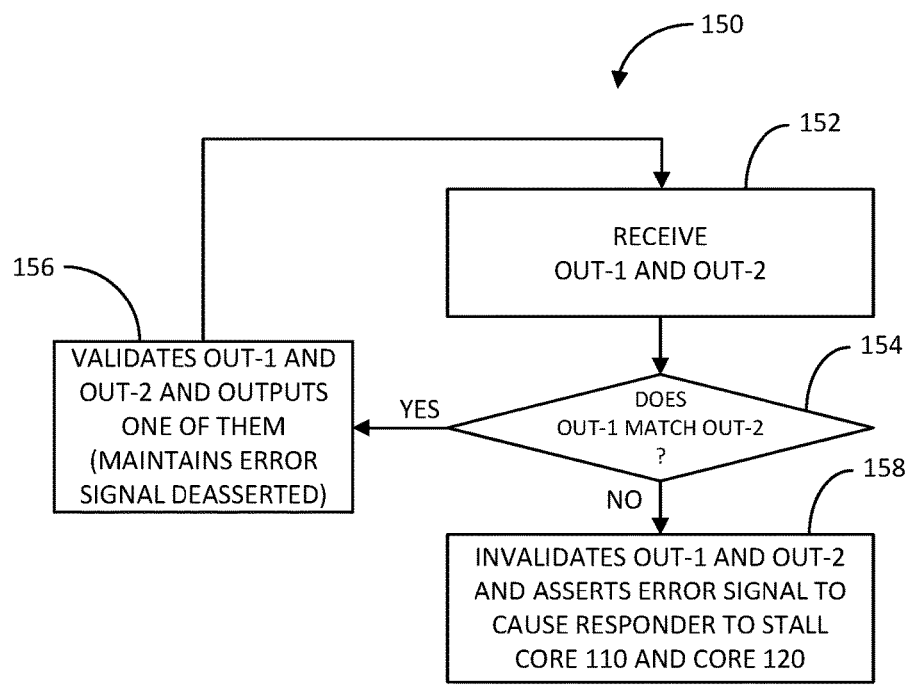
FIG. 1B illustrates a flow diagram of an exemplary method of detecting an error in the operation of at least one of the redundant data processing cores in accordance with another aspect of the disclosure.

FIG. 1B illustrates a flow diagram of an exemplary method 150 performed by the voter-comparator 130 in accordance with another aspect of the disclosure. According to the method 150, the voter-comparator 130 receives the data outputs OUT-1 and OUT-2 from the redundant data processing cores 110 and 120, respectively (block 152). The voter-comparator 130 determines whether the output OUT-1 matches the output OUT-2 (block 154).

If, in block 154, the voter-comparator 130 determines that the outputs OUT-1 and OUT-2 match, the voter-comparator 130 validates the data outputs OUT-1 and OUT-2, and outputs either one of them to be used for controlling an operation of an associated system, such as an automotive system (block 156). In block 156, the voter-comparator 130 maintains the ERROR signal deasserted. After performing the operations specified in block 156, the voter-comparator 130 returns to block 152 for receiving the next data outputs generated per the next executed lockstep instructions. If, in block 154, the voter-comparator 130 determines that the data outputs OUT-1 and OUT-2 do not match, the voter-comparator 130 invalidates the data outputs OUT-1 and OUT-1, and asserts the error signal ERROR (block 158). In such case, the voter-comparator 130 may suppress the outputting of any of the invalid data outputs OUT-1 and OUT-2.

A drawback of the system 100 is that there is still a probability that both data processing cores 110 and 120 generate matching data outputs OUT-1 and OUT-2, albeit in error. This may be the case where a condition affects both data processing cores 110 and 120 in substantially the same manner. For example, a drop in the supply voltage provided to both cores 110 and 120 by a power distribution network (PDN) may cause both cores to timing marginality and output matching data in error. As another example, a temperature change or gradient in an integrated circuit (IC) incorporating the data processing cores 110 and 120 may produce timing marginality, resulting in matching data in error.

In such case, the system 100 cannot detect the aforementioned error because the system is designed with the assumption that no error has occurred if the respective outputs OUT-1 and OUT-2 of the cores 110 and 120 match. This non-detected error is referred to as a false pass. Such error occurring in the system 100 may have detrimental effects on the safety of people and prevention of property damage.

Figure 2A:
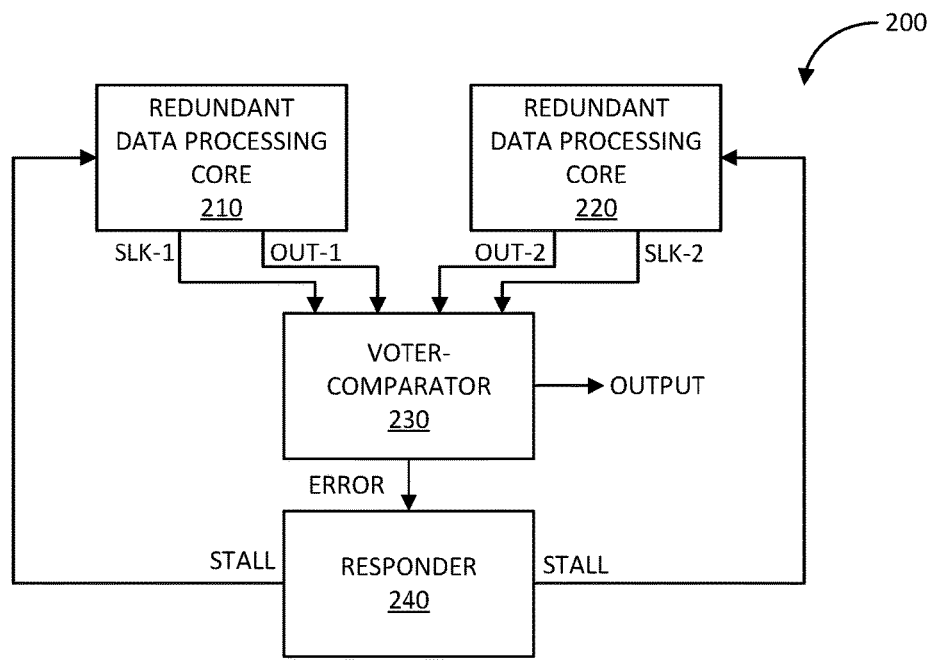
FIG. 2A illustrates a block diagram of another exemplary lockstep dual core processing system in accordance with another aspect of the disclosure.

FIG. 2A illustrates a block diagram of another exemplary lockstep dual core system 200 in accordance with another aspect of the disclosure. The system 200 may be used in applications that involve the safety of people and prevention of damage to property. For instance, the system 200 may be an example of a lockstep dual core system or a TMR system employed in automotive electronic systems.

The system 200 is configured to address the drawback of the system 100 of not being able to detect a false pass when redundant cores output matching data in error. Again, as discussed above, such errors may occur because a condition has arisen that affects both the cores in substantially the same manner Examples of such condition include supply voltage droop or changes in temperature gradient across an integrated circuit (IC).

In summary, the system 200, in addition to detecting whether data outputs of redundant data processing cores match, determines whether there is a timing violation in one or more selected data paths (e.g., critical paths) in each of the data processing cores. For example, the system 200 detects an error in response to: (1) the outputs of the cores not matching; (2) detecting a timing violation in at least one data path in at least one of the redundant cores; or (3) both the outputs of the cores not matching and detecting a timing violation in at least one data path in at least one of the redundant cores. The concept behind the system 200 is that even though the outputs of the redundant cores match, the outputs are deemed in error if there is at least one timing violation in at least one selected data path in at least one of the redundant cores.

In particular, the system 200 includes a first redundant data processing core 210, a second redundant data processing core 220, a voter-comparator 230, and a responder 240. The data processing cores 210 and 220 are configured to generate respective data outputs OUT-1 and OUT-2 based on respective lockstep instructions executed by the cores, respectively.

In addition, the first redundant data processing core 210 includes a first set of one or more timing violation detection circuits, such as slack monitoring flops (SMFs), which detect timing violations in a first set of one or more selected (e.g., critical) data paths in the first core 210. Accordingly, the first data processing core 210 is configured to generate a signal SLK-1 to indicate whether a timing violation has occurred in at least one of the selected data paths in the first set. For example, if the signal SLK-1 is asserted, this indicates that a timing violation has occurred, and if the signal SLK-1 is not asserted, that indicates that a timing violation has not occurred.

Similarly, the second redundant data processing core 220 includes a second set of one or more timing violation detection circuits, such as SMFs, which detect timing violations in a second set of one or more selected (e.g., critical) data paths in the second core 220. Accordingly, the second data processing core 220 is configured to generate a signal SLK-2 to indicate whether a timing violation has occurred in at least one of the selected data paths in the second set (e.g., if SLK-2 is asserted, at least one timing violation has occurred; if SLK-2 is not asserted, no timing violation has occurred).

The voter-comparator 230 receives the data outputs OUT-1 and OUT-2 from the first and second data processing cores 210 and 220, as well as their respective timing violation signals SLK-1 and SLK-2. The voter-comparator 230 validates or invalidates the data outputs OUT-1 and OUT-2 and asserts or deasserts an error signal ERROR based on the states of the signals OUT-1, OUT-2, SLK-1, and SLK-2.

For example, the voter-comparator 230 invalidates the data outputs OUT-1 and OUT-2 and asserts the error signal ERROR in response to the following condition: (1) the data outputs OUT-1 and OUT-2 generated by the data processing cores 210 and 220 do not match; (2) at least one of the signals SLK-1 or SLK-2 is asserted (indicates a timing violation); or (3) both data outputs OUT-1 and OUT-2 do not match and at least one of the signals SLK-1 or SLK-2 indicates a timing violation. As previously discussed, the concept behind the system 200 is that even though the data outputs OUT-1 and OUT-2 of the redundant processing cores 210 and 220 match, the outputs OUT-1 and OUT-2 are deemed in error if at least one timing violation has occurred as indicated by at least one of the signals SLK-1 or SLK-2. In such case, the voter-comparator 130 may suppress the outputting of any of the data outputs OUT-1 or OUT-2 for use by another component. The voter-comparator 230 may maintain as its output the previous validated data output OUT-1 or OUT-2 generated from a previous lockstep instruction executed by the data processing cores 210 and 220.

If the voter-comparator 230, based on the signals OUT-1, OUT-2, SLK-1, and SLK-2, validates the data outputs OUT-1 and OUT-2 generated by the data processing cores 210 and 220 (based on the data outputs OUT-1 and OUT-2 matching and neither SLK-1 nor SLK-2 indicating a timing violation), the voter-comparator 230 outputs either one of the data outputs OUT-1 or OUT-2 for use by another component based on the application in which the system 200 is employed. Additionally, the voter-comparator 230 also maintains the ERROR signal deasserted if the data outputs OUT-1 and OUT-2 are validated.

In response to the error signal ERROR being deasserted, the responder 240 maintains the STALL signal deasserted. Accordingly, the dual processing cores 210 and 220 may continue to operate in a normal (non-error) manner, such as executing the following lockstep instruction.

In response to the error signal ERROR being asserted, the responder 240 may assert its stall signal STALL. In response to the stall signal STALL being asserted, the operations of the data processing cores 210 and 220 may be stalled and rolled back to the state prior to the execution of the lockstep instruction that resulted in the stall signal STALL being asserted. Although, in this example, the responder 240 stalls the data processing cores and rolls their respective states to prior to the error condition, it shall be understood that the responder 240 may perform any operation in response to the ERROR signal being asserted.

Figure 2B:
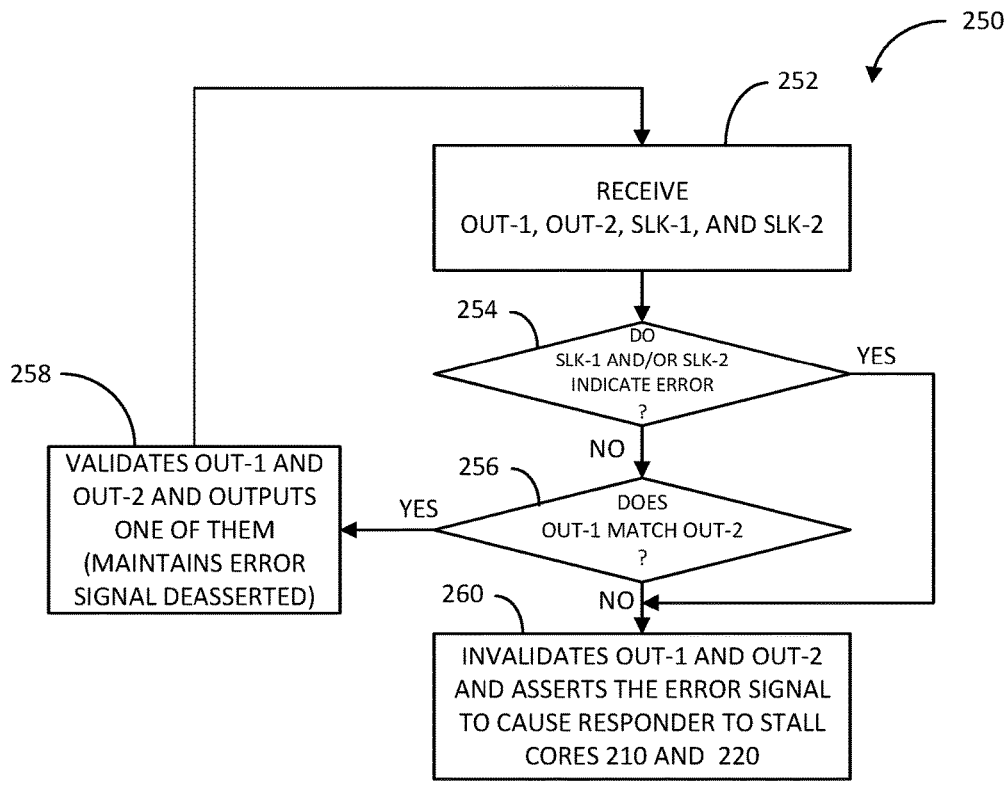
FIG. 2B illustrates a flow diagram of an exemplary method of detecting a false pass condition in accordance with another aspect of the disclosure.

FIG. 2B illustrates a flow diagram of an exemplary method 250 performed by the voter-comparator 230 in accordance with another aspect of the disclosure. According to the method 250, the voter-comparator 130 receives the data outputs OUT-1 and OUT-2 and timing violation signals SLK-1 and SLK-2 from the data processing cores 210 and 220, respectively (block 252).

The voter-comparator 230 then determines whether at least one of the signal SLK-1 or SLK-2 indicates a timing violation error (block 254). If the voter-comparator 230 determines that signals SLK-1 and SLK-2 indicate no timing violation, the voter-comparator 230 proceeds to perform the operation specified in block 256. If the voter-comparator 230 determines that at least one of the signals SLK-1 or SLK-2 indicates a timing violation, the voter-comparator 230 invalidates the data outputs OUT-1 and OUT-2 and generates an asserted error signal ERROR to stall the operations of the data processing cores 210 and 220 and/or perform some other operation (block 260).

In block 256, the voter-comparator 230 determines whether the output OUT-1 matches the output OUT-2. If the voter-comparator 230 determines that the outputs OUT-1 and OUT-2 match, the voter-comparator 230 validates the data outputs OUT-1 and OUT-2, outputs either one of them for use by another component, and maintains the error signal ERROR deasserted (Block 258). The method 250 then returns back to block 252 to process the next set of signals OUT-1, OUT-2, SLK-1, and SLK-2 generated by the data processing cores 210 and 220 in response to a following executed lockstep instruction.

If, in block 256, the voter-comparator 230 determines that the outputs OUT-1 and OUT-2 do not match, the voter-comparator 230 invalidates the data outputs OUT-1 and OUT-2 and generates an asserted error signal ERROR to stall the operations of the data processing cores 210 and 220 and/or perform some other operation (block 258). It shall be understood that the voter-comparator 230 may perform the operations indicated in blocks 254 and 256 in different order.

Figure 2C:
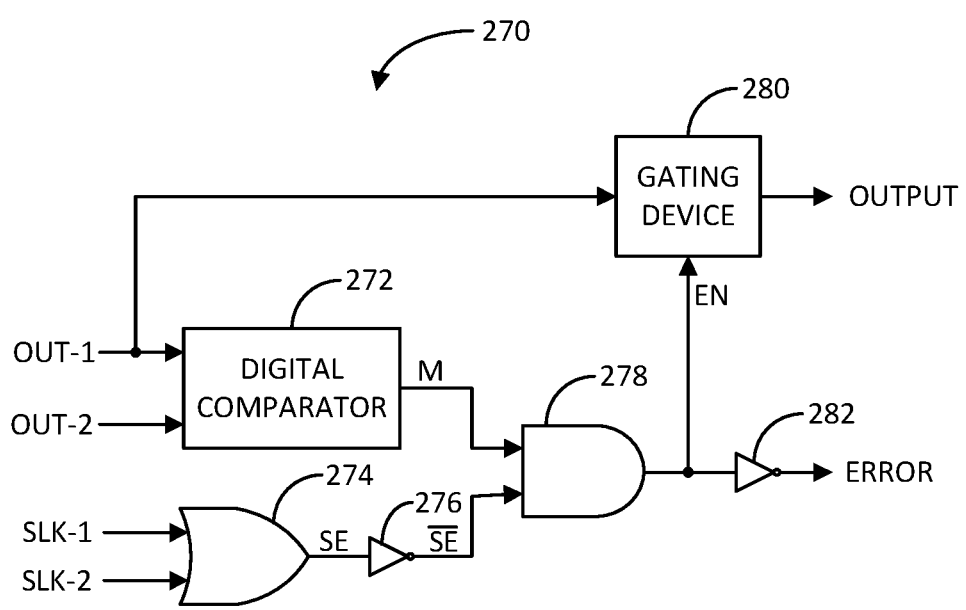
FIG. 2C illustrates a block diagram of an exemplary voter-comparator in accordance with another aspect of the disclosure.

FIG. 2C illustrates a block diagram of an exemplary voter-comparator 270 in accordance with another aspect of the disclosure. The voter-comparator 270 may be an exemplary detailed implementation of the voter-comparator 230 previously discussed. It shall be understood that the voter-comparator 230 may be implemented in other manners.

The voter-comparator 270 includes a digital comparator 272, an OR-gate 274 followed by an inverter 276 (e.g., collectively a NOR-gate), an AND-gate 278, a gating device 280, and an inverter 282.

The data outputs OUT-1 and OUT-2 generated by the redundant data processing cores 210 and 220 are applied to inputs of the digital comparator 272. The digital comparator 272 is configured to generate a signal M indicating whether the data outputs OUT-1 and OUT-2 match (e.g., If signal M is at a high logic level, the data outputs OUT-1 and OUT-2 match; if signal M is at a low logic level, the data outputs OUT-1 and OUT-2 do not match).

The timing violation signals SLK-1 and SLK-2 generated by the redundant data processing cores 210 and 220 are applied to inputs of the OR-gate 274. The OR-gate 274 is configured to generate a signal SE indicating whether any one or both of the timing violation signals SLK-1 or SLK-2 indicates a timing violation occurring in one or both of the redundant data processing cores 210 or 220 (e.g., If signal SE is at a high logic level, there is a timing violation occurring in one or both of the redundant data processing cores 210 and 220; if signal SE is at a low logic level, there is no timing violation occurring in the redundant data processing cores 210 and 220). The inverter 278 inverts the signal SE to generate $\overline{SE}$.

The signals M and $\overline{SE}$ are applied to respective inputs of AND-gate 278. The AND-gate 278 is configured to generate an enable signal EN indicating whether the data outputs OUT-1 and OUT-2 are valid (e.g., If the enable signal EN is at a high logic level, the data outputs OUT-1 and OUT-2 are valid; if the enable signal EN is at a low logic level, the data outputs OUT-1 and OUT-2 are not valid.). The enable signal EN is applied to a control input of the gating device 280. One of the data outputs OUT-1 or OUT-2 (in this example, OUT-1) is applied to a data input of the gating device 280. The gating device 280 is configured to output the data output OUT-1 (or OUT-2) in response to the enable signal EN being asserted (e.g., being at a high logic level); and not to output the data output OUT-1 (or OUT-2) (e.g., tristate the output) in response to the enable signal EN being deasserted (e.g., being at a low logic level).

The inverter 282 inverts the enable signal EN to generate an ERROR signal. The ERROR signal indicates whether the data outputs OUT-1 and OUT-2 are not valid (e.g., If the ERROR signal is at a high logic level, the data outputs OUT-1 and OUT-2 are not valid; if the ERROR signal is at a low logic level, the data outputs OUT-1 and OUT-2 are valid.).

In operation, in the case where the data outputs OUT-1 and OUT-2 match and there are no timing violations, the digital comparator 272 generates the M signal at a logic high level and the inverter 276 generates the $\overline{SE}$ signal at a logic high level. Accordingly, the AND-gate 278 generates the enable signal EN at a logic high level. In response, the gating device 280 outputs the data output OUT-1, and the inverter 282 generates a deasserted ERROR signal.

In the case where the data outputs OUT-1 and OUT-2 do not match and there are no timing violations, the digital comparator 272 generates the M signal at a logic low level and the inverter 276 generates the $\overline{SE}$ signal at a logic high level. Accordingly, the AND-gate 278 generates the enable signal EN at a logic low level. In response, the gating device 280 does not output the data output OUT-1, and the inverter 282 generates an asserted ERROR signal.

In the case where the data outputs OUT-1 and OUT-2 match and there is at least one timing violation, the digital comparator 272 generates the M signal at a logic high level and the inverter 276 generates the $\overline{SE}$ signal at a logic low level. Accordingly, the AND-gate 278 generates the enable signal EN at a logic low level. In response, the gating device 280 does not output the data output OUT-1, and the inverter 282 generates an asserted ERROR signal.

In the case where the data outputs OUT-1 and OUT-2 do not match and there is at least one timing violation, the digital comparator 272 generates the M signal at a logic low level and the inverter 276 generates the $\overline{SE}$ signal at a logic low level. Accordingly, the AND-gate 278 generates the enable signal EN at a logic low level. In response, the gating device 280 does not output the data output OUT-1, and the inverter 282 generates an asserted ERROR signal.

Figure 3:
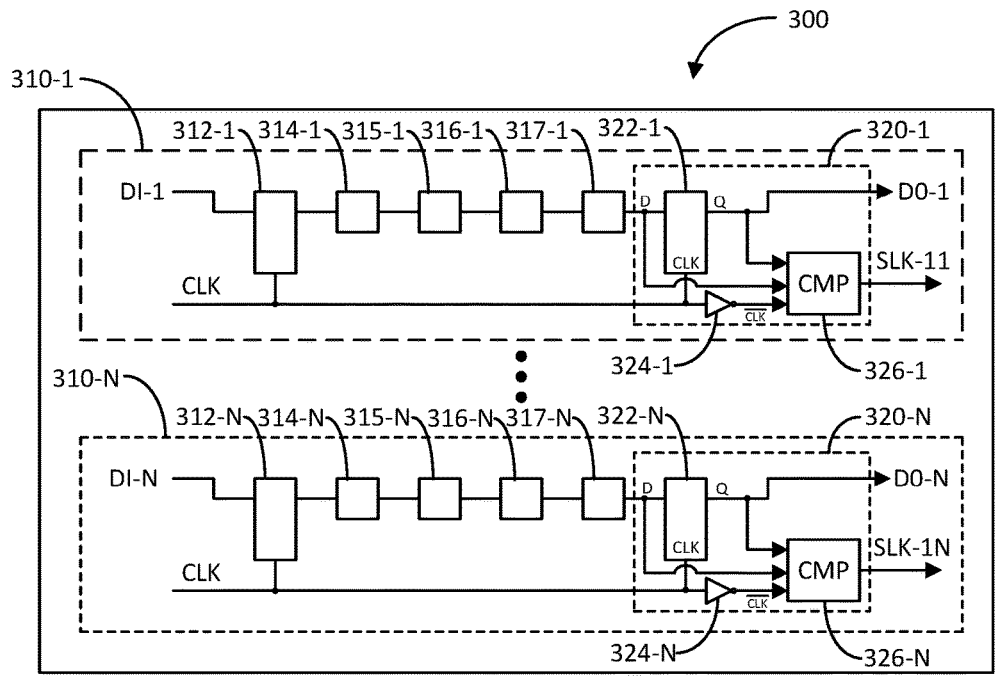
FIG. 3 illustrates a block diagram of an exemplary data processing core in accordance with another aspect of the disclosure.

FIG. 3 illustrates a block diagram of an exemplary data processing core 300 in accordance with another aspect of the disclosure. The data processing core 300 is an example of a more detailed implementation of one or both of the data processing cores 210 and 220 previously discussed. The data processing cores 300 includes a plurality of selected data paths 310-1 to 310-N including timing violation detection circuits 320-1 to 320-N (also known as slack monitoring flops (SMFs)), respectively. As previously discussed, such detection circuits 320-1 to 320-N may be implemented in certain critical data paths of the core 300.

Such critical data paths may have relatively small slack margins as compared to other data paths in the core. The slack margin may be defined as a time difference between when an input data bit has reached a stabilized state and a set up time specified for a flip-flop; or defined as a time difference between when the input data bit exits the stabilized state and a hold time specified for the flip-flop. Data paths with relatively small slack margin may exhibit timing violations (e.g., when one or more of the aforementioned time differences is negative) due to certain conditions, such as a supply voltage droop or a sudden temperature rise or gradient. Thus, the timing violation detection circuits may be implemented in critical data paths to determine whether an error has occurred in the data output of the core. As each timing violation detection circuit consumes power, for power consumption purposes, such detection circuits may be implemented only in selected (e.g., critical) data paths, and not all data paths of the core. A selected critical path may be defined as one having a slack margin below a defined threshold.

As exemplified, the data path 310-1 includes an input latch or flip-flop 312-1 configured to receive an input data DI-1 and output the data DI-1 based on a clock signal CLK. The data path 310-1 may further include one or more additional logic circuits 314-1, 315-1, 316-1, and 317-1 coupled in series to the output of the input latch or flip-flop 312-1. The logic circuits 314-1, 315-1, 316-1, and 317-1 may perform various operations and may receive other data based on the intended operation of the data path 310-1. The data path 310-1 further includes a timing violation detection circuit 320-1 coupled to the output of logic circuit 317-1.

As exemplified, the timing violation detection circuit 320-1 includes an input latch or flip-flop 322-1 having a data input (D), a data output (Q), and a clock input (CLK). The flip-flop 322-1 receives the output of the logic circuit 317-1 at its data input (D) and receives the clock signal CLK at its clock input (CLK). Additionally, the timing violation detection circuit 320-1 further includes an inverter 324-1 and a comparator (CMP) 326-1. The inverter 324-1 inverts the clock signal CLK. The comparator 326-1 receives the data signal at the data input (D) of the flip-flop 322-1, the data signal DO-1 at the data output (Q) of the flip-flop 322-1, and the inverted clock signal $\overline{CLK}$. The comparator 326-1 generates a signal SLK-11 indicative of whether a timing violation has occurred in the data path 310-1.

Each of the other data paths may be configured similar to that of data path 310-1. For instance, the data path 310-N includes an input latch or flip-flop 312-N configured to receive an input data DI-N and output the data DI-N based on the clock signal CLK. The data path 310-N may further include one or more additional logic circuits 314-N, 315-N, 316-N, and 317-N coupled in series to the output of the input latch or flip-flop 312-N. The logic circuits 314-N, 315-N, 316-N, and 317-1N may perform various operations and may receive other data based on the intended operation of the data path 310-N. The data path 310-N further includes a timing violation detection circuit 320-N coupled to the output of logic circuit 317-N.

As exemplified, the timing violation detection circuit 320-N includes an input latch or flip-flop 322-N having a data input (D), a data output (Q), and a clock input (CLK). The flip-flop 322-N receives the output of the logic circuit 317-N at its data input (D) and receives the clock signal CLK at its clock input (CLK). Additionally, the timing violation detection circuit 320-N further includes an inverter 324-N and a comparator (CMP) 326-N. The inverter 324-N inverts the clock signal CLK. The comparator 326-N receives the data signal at the data input (D) of the flip-flop 322-N, the data signal DO-1 at the data output (Q) of the flip-flop 322-N, and the inverted clock signal $\overline{CLK}$. The comparator 326-N generates a signal SLK-1N indicative of whether a timing violation has occurred in the data path 310-N.

As discussed above, the comparators 326-1 to 326-N generate corresponding signals SLK-11 to SLK-1N to indicate whether timing violations have occurred in the corresponding data paths 310-1 to 310-N, respectively. In particular, each comparator (326-1 to 326-N) asserts the corresponding signal (SLK-11 to SLK-1N) in response to the corresponding D-signal and corresponding Q-signal of the corresponding flip-flip (322-1 to 322-NO not matching at the time of the triggering edge of the inverted clock signal $\overline{CLK}$; otherwise, the corresponding signal (SLK-11 to SLK-1N) is not asserted. That is, if the comparator determines that the D- and Q-signals match at the time of the triggering edge of the inverted clock signal $\overline{CLK}$, then there is no timing violation. Otherwise, if the comparator determines that the D- and Q-signals do not match at the time of the triggering edge of the inverted clock signal $\overline{CLK}$, then there is a timing violation. Each of the signals SLK-11 to SLK-1N (e.g., collectively as SLK-1 in system 200) may be applied to the voter-comparator 230 or via a multiple-input OR-gate or multiplexer (not shown).

Figure 4:
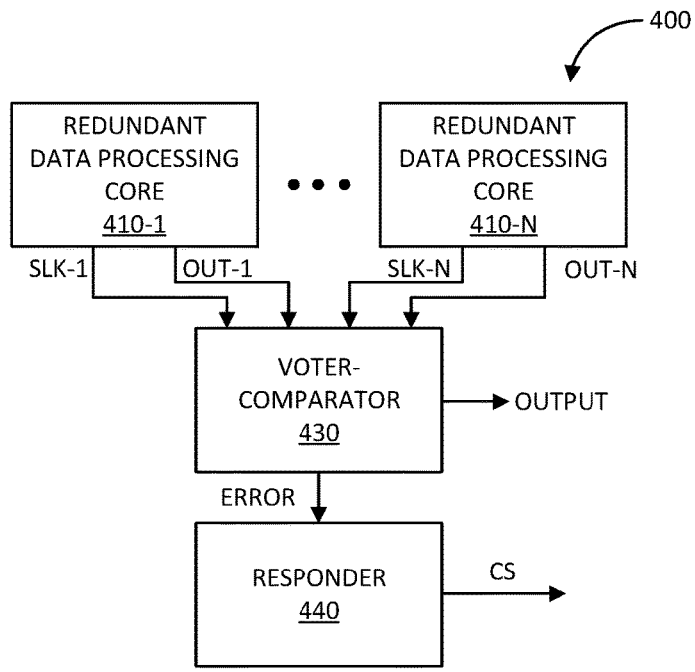
FIG. 4 illustrates a block diagram of another exemplary lockstep dual processing core system in accordance with another aspect of the disclosure.

FIG. 4 illustrates a block diagram of an exemplary data processing system 400 in accordance with another aspect of the disclosure. The previous exemplary data processing system 200 includes two redundant data processing cores 210 and 220. It shall be understood that the techniques described herein may be applicable to a system having N number of data processing cores, wherein N is two or more (e.g., a TMR system having three (3) data processing cores, as exemplified further herein). The data processing system 400 is an example of such a system.

The system 400 includes N redundant data processing cores 410-1 to 410-N configured to generate N data outputs OUT-1 to OUT-N and N timing violation signals SLK-1 to SLK-N in response to lockstep instructions. The signals OUT-1 to OUT-N and SLK-1 to SLK-N are applied to a voter-comparator 430 that generates an output and an error signal ERROR. The voter-comparator 430 validates and outputs any one of a pair of the data outputs OUT-1 to OUT-N if such outputs match and if the corresponding pair of timing violation signals SLK-1 to SLK-N do not indicate a timing violation. In such case, the voter-comparator 430 maintains the error signal deasserted.

If there is not at least one pair of data outputs OUT-1 to OUT-N that match with corresponding timing violation signals SLK-1 to SLK-N indicating no timing violation, the voter-comparator 430 invalidates the data outputs OUT-1 to OUT-N, suppresses the outputting of any of them, and also asserts the ERROR signal. Optionally, the voter-comparator 430 may output the previous validated data output generated by the processing cores 410-1 to 410-N based on a previous set of executed lockstep instructions.

The system 400 includes a responder 440 configured to generate a control signal CS in response to an asserted error signal ERROR. For example, the control signal CS may be configured to control one or more defined operations, such as stalling the data processing cores 410-1 to 410-N and configuring them to their respective states prior to the execution of the lockstep instructions that resulted in the error signal ERROR being asserted. The control signal CS may not control any operation in response to the error signal ERROR not being asserted (e.g., being deasserted).

Figure 5A:
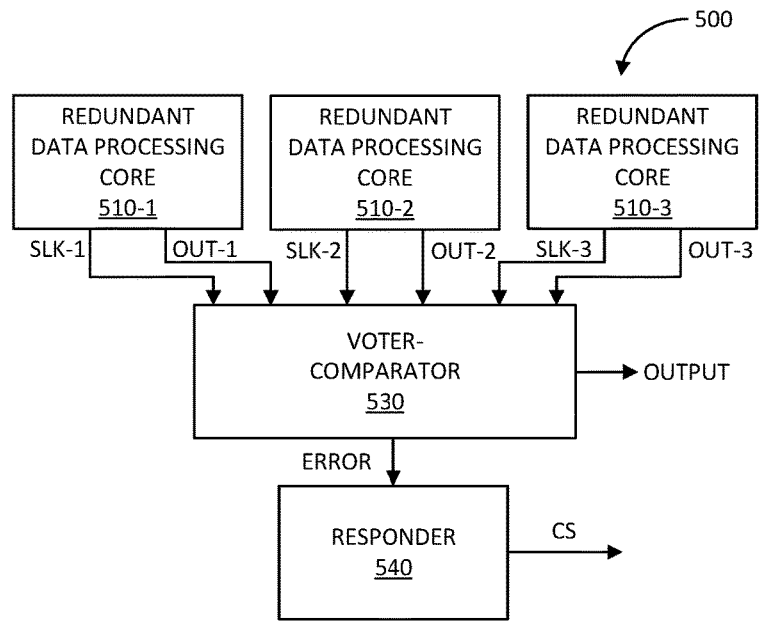
FIG. 5A illustrates a block diagram of an exemplary triple modular redundancy (TMR) system in accordance with another aspect of the disclosure.

FIG. 5A illustrates a block diagram of an exemplary triple modular redundancy (TMR) system 500 in accordance with another aspect of the disclosure. The TMR system 500 includes redundant data processing cores 510-1, 510-2, and 510-3, a voter-comparator 530, and a responder 540.

The redundant data processing cores 510-1, 510-2, and 510-3 generate their respective data outputs and timing violation signals (OUT-1, SLK-1), (OUT-2, SLK-2), and (OUT-3, SLK-3) in response to executing lockstep instructions, respectively. The voter-comparator 530 receives signals (OUT-1, SLK-1), (OUT-2, SLK-2), and (OUT-3, SLK-3) from the data processing cores 510-1, 510-2, and 510-3, respectively.

The voter-comparator 530 validates the data outputs OUT-1 to OUT-3 and outputs either one of them for use by another if at least two of the data outputs are considered correct or reliable data. The data outputs are considered correct or reliable data if at least two of the data outputs match and the corresponding at least two timing violations signals indicate no timing violation. If the voter-comparator 530 determines that the data outputs OUT-1 to OUT-3 are valid, then the voter-comparator 530 maintains the ERROR signal deasserted.

As a first example, if all of the three data outputs OUT-1, OUT-2, and OUT-3 match, and all three of the timing violation signals SLK-1, SLK-2, and SLK-3 indicate no timing violation, the voter-comparator 530 validates the data outputs OUT-1, OUT-2, and OUT-3, and outputs one of them for use by another component.

As another example, if data outputs OUT-1 and OUT-2 match, data output OUT-3 does not match OUT-1 and OUT-2, and timing violation signals SLK-1 and SLK-2 indicate no timing violation, the voter-comparator 530 validates data outputs OUT-1 and OUT-2, and outputs one of them for use by another component. In this case, the voter-comparator 530 invalidates data output OUT-3 (e.g., is deemed incorrect or unreliable data cause it does not match OUT-1 and OUT-2).

Similarly, if data outputs OUT-2 and OUT-3 match and timing violations SLK-2 and SLK-3 indicate no timing violation, the voter-comparator 530 validates data outputs OUT-2 and OUT-3, and outputs one of them for use by another component; and invalidates OUT-1 since it does not match OUT-2 and OUT-3. In a like manner, if data outputs OUT-1 and OUT-3 match and timing violations SLK-1 and SLK-3 indicate no timing violation, the voter-comparator 530 validates data outputs OUT-1 and OUT-3, and outputs one of them for use by another component; and invalidates OUT-2 since it does not match OUT-2 and OUT-3.

The voter-comparator 530 may suppress the outputting of any of the data outputs OUT-1, OUT-2, and OUT-3 if all the data outputs are considered incorrect or unreliable data (invalidated). The data outputs are invalid if any of the following condition occurs: (1) all three data outputs OUT-1, OUT-2, and OUT-3 are different; (2) only two of the data outputs OUT-1/OUT-2, OUT-1/OUT-3, or OUT-2/OUT-3 match but at least one of their corresponding timing signals SLK-1/SLK-2, SLK-1/SLK-3, or SLK-2/SLK-3 indicates a timing violation; or (3) two or more of the timing violation signals SLK-1, SLK-2, and SLK-3 indicate timing violations. In such case, the voter-comparator 530 may output the validated data output OUT-1, OUT-2, or OUT-3 from a previous set of lockstep instructions executed by the data processing cores 510-1 to 510-3. Additionally, the voter-comparator 530 asserts the ERROR signal.

The responder 540 generates or changes the state (asserted versus deasserted) of a control signal CS based on the state of the ERROR signal. For example, if the error signal is maintained deasserted by the voter-comparator 530 because data received from the data processing cores 510-1 to 510-3 is validated, the responder 540 may not generate the control signal CS or maintains the control signal CS deasserted. In other words, the responder 540 may perform no action if the data received from the data processing cores 510-1 to 510-3 is deemed valid.

If the error signal is asserted by the voter-comparator 530 because the data received from the data processing cores 510-1 to 510-3 is deemed invalid, the responder 540 generates or asserts the control signal CS. In other words, the responder 540 performs one or more defined operations if the data received from the data processing cores 510-1 to 510-3 is deemed incorrect or unreliable data. As previously discussed, such one or more defined operations include stalling the operation of the redundant processing cores 510-1 to 510-3, and configuring them to their respective states prior to the execution of the lockstep instructions that produced the incorrect or unreliable data.

Figure 5B:
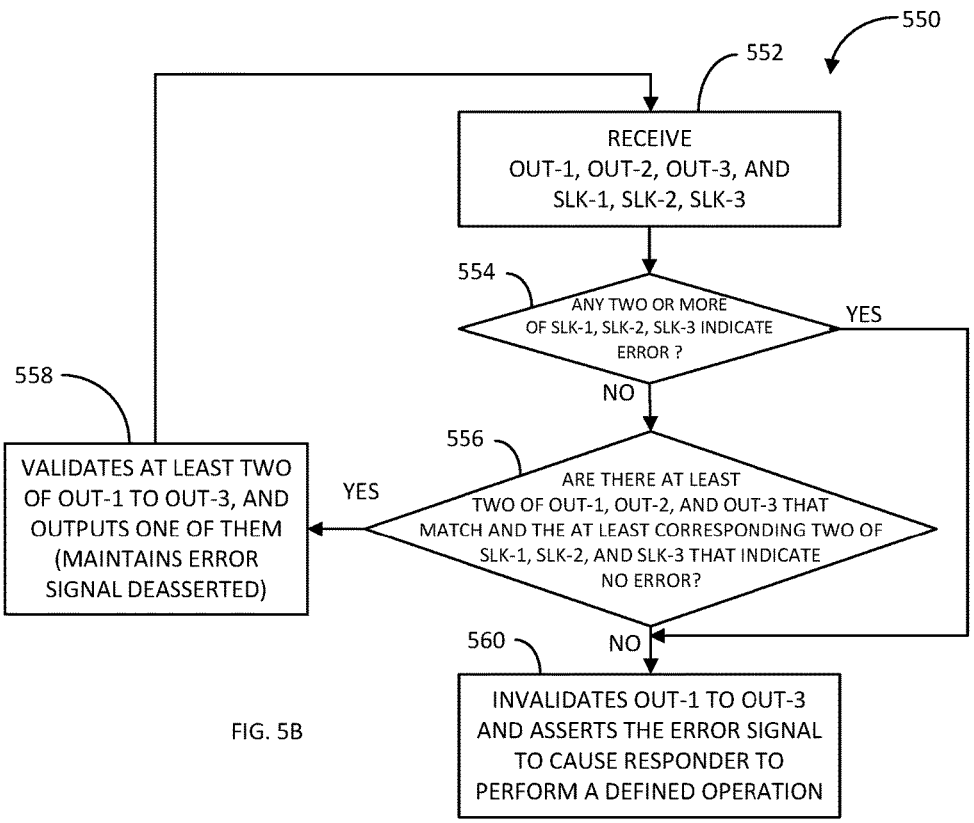
FIG. 5B illustrates a flow diagram of an exemplary method of processing data outputs from redundant data processing cores in accordance with another aspect of the disclosure.

FIG. 5B illustrates a flow diagram of an exemplary method 550 of processing outputs from data processing cores in accordance with another aspect of the disclosure. The method 550 may be implemented by the voter-comparator 530. According to the method 550, in response to the execution of a set of lockstep instructions by the data processing cores 510-1 to 510-3, the voter-comparator 530 receives outputs OUT-1/SLK-1, OUT-2/SLK-2, and OUT-3/SLK-3 from the data processing cores 510-1 to 510-3, respectively (block 552).

According to the method 550, the voter-comparator 530 determines whether two or more of the timing violation signals SLK-1, SLK-2, and SLK-3 indicate timing violations (block 554). If the voter-comparator 530 determines that two or more of the timing violations signals SLK-1, SLK-2, and SLK-3 indicate timing violations, the voter-comparator 530 invalidates the data outputs OUT-1 to OUT-3 and asserts the ERROR signal to cause the responder 540 to perform a defined operation (block 560). It shall understood that the voter-comparator 530 may perform one or more other operations, such as suppressing the outputting of any of the data outputs OUT-1 to OUT-3.

If, in block 554, the voter-comparator 530 determines that at least two corresponding timing violation signals indicate no timing violations, the voter-comparator 530 determines whether the data outputs OUT-1 to OUT-3 corresponding to the at least two timing violation signals match (block 556). If yes, then at least two data outputs of the data processing cores 510-1 to 510-3 are deemed valid by the voter-comparator 530, and the voter-comparator 530 outputs one of them for use by another component (block 558). In such case, the voter-comparator 530 maintains the ERROR signal deasserted.

If, in block 556, the voter-comparator 530 determines that there are no two matching data outputs with the corresponding timing violation signals indicating no timing violations, the voter-comparator 530 invalidates the data outputs OUT-1 to OUT-3 and asserts the ERROR signal to cause the responder 540 to perform a defined operation (block 560). As discussed above, it shall understood that the voter-comparator 530 may perform one or more other operations, such as suppress the outputting of any of the data outputs OUT-1 to OUT-3.

Figure 5C:
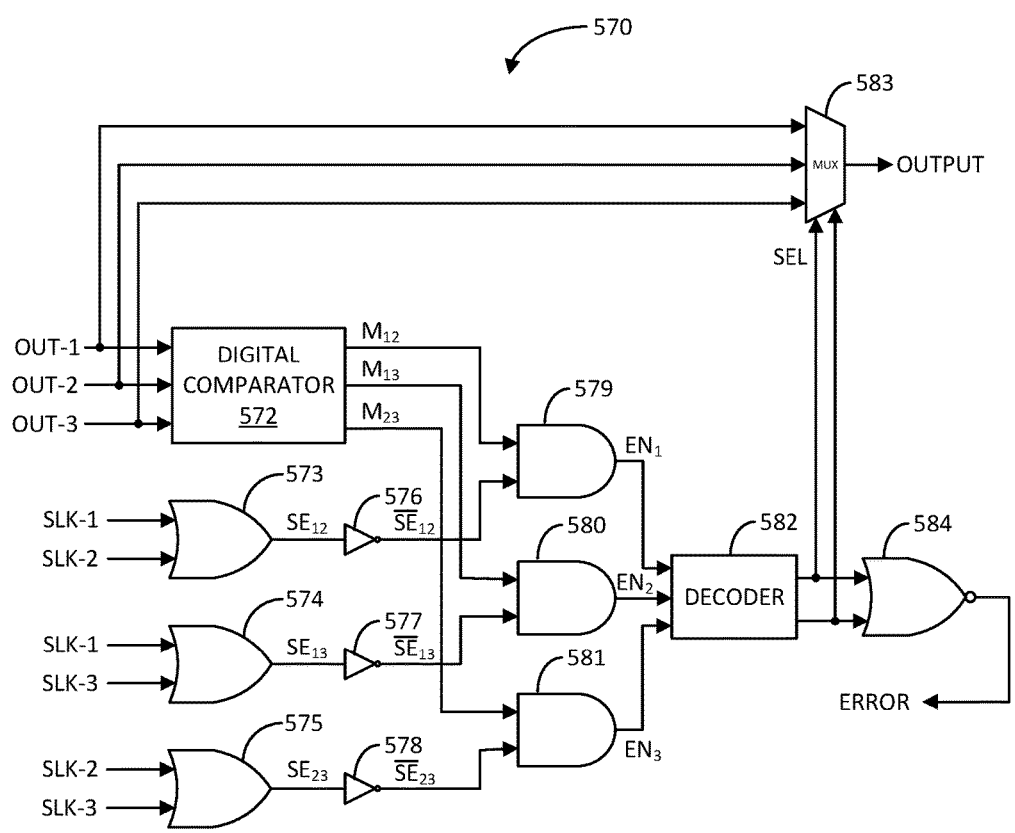
FIG. 5C illustrates a block diagram of another exemplary voter-comparator in accordance with another aspect of the disclosure.

FIG. 5C illustrates a block diagram of another exemplary voter-comparator 570 in accordance with another aspect of the disclosure. The voter-comparator 570 may be an exemplary detailed implementation of the voter-comparator 530 previously discussed. It shall be understood that the voter-comparator 530 may be implemented in other manners.

The voter-comparator 570 includes a digital comparator 572, a first OR-gate 573 followed by a first inverter 576 (e.g., collectively a first NOR-gate), a first AND-gate 579, a second OR-gate 574 followed by a second inverter 577 (e.g., collectively a second NOR-gate), a second AND-gate 580, a third OR-gate 575 followed by a third inverter 578 (e.g., collectively a third NOR-gate), a third AND-gate 581, a decoder 582, a multiplexer 583, and a NOR-gate 584.

The data outputs OUT-1, OUT-2, and OUT-3 generated by the redundant data processing cores 510-1, 510-2, and 510-3 are applied to respective inputs of the digital comparator 572. The digital comparator 572 is configured to generate a signal $M_{12}$ indicating whether the data outputs OUT-1 and OUT-2 match (e.g., If signal $M_{12}$ is at a high logic level, the data outputs OUT-1 and OUT-2 match; if signal $M_{12}$ is at a low logic level, the data outputs OUT-1 and OUT-2 do not match). The digital comparator 572 is also configured to generate a signal $M_{13}$ indicating whether the data outputs OUT-1 and OUT-3 match (e.g., If signal $M_{13}$ is at a high logic level, the data outputs OUT-1 and OUT-3 match; if signal $M_{13}$ is at a low logic level, the data outputs OUT-1 and OUT-3 do not match). Further, the digital comparator 572 is configured to generate a signal $M_{23}$ indicating whether the data outputs OUT-2 and OUT-3 match (e.g., If signal $M_{23}$ is at a high logic level, the data outputs OUT-2 and OUT-3 match; if signal $M_{23}$ is at a low logic level, the data outputs OUT-2 and OUT-3 do not match).

The timing violation signals SLK-1 and SLK-2 generated by the redundant data processing cores 510-1 and 510-2 are applied to respective inputs of the first OR-gate 573. The first OR-gate 573 is configured to generate a signal $SE_{12}$ indicating whether any one or both of the timing violation signals SLK-1 or SLK-2 indicates a timing violation occurring in one or both of the redundant data processing cores 510-1 or 510-2 (e.g., If signal $SE_{12}$ is at a high logic level, there is a timing violation occurring in one or both of the redundant data processing cores 510-1 and 510-2; if signal $SE_{12}$ is at a low logic level, there is no timing violation occurring in the redundant data processing cores 510-1 and 510-2). The first inverter 576 inverts the signal $SE_{12}$ to generate $\overline{SE}_{12}$.

Similarly, the timing violation signals SLK-1 and SLK-3 generated by the redundant data processing cores 510-1 and 510-3 are applied to respective inputs of the second OR-gate 574. The second OR-gate 574 is configured to generate a signal $SE_{13}$ indicating whether any one or both of the timing violation signals SLK-1 or SLK-3 indicates a timing violation occurring in one or both of the redundant data processing cores 510-1 or 510-3 (e.g., If signal $SE_{13}$ is at a high logic level, there is a timing violation occurring in one or both of the redundant data processing cores 510-1 and 510-3; if signal $SE_{13}$ is at a low logic level, there is no timing violation occurring in the redundant data processing cores 510-1 and 510-3). The second inverter 577 inverts the signal $SE_{13}$ to generate $\overline{SE}_{13}$.

In a like manner, the timing violation signals SLK-2 and SLK-3 generated by the redundant data processing cores 510-2 and 510-3 are applied to respective inputs of the third OR-gate 575. The third OR-gate 575 is configured to generate a signal $SE_{23}$ indicating whether any one or both of the timing violation signals SLK-2 or SLK-3 indicates a timing violation occurring in one or both of the redundant data processing cores 510-2 or 510-3 (e.g., If signal $SE_{23}$ is at a high logic level, there is a timing violation occurring in one or both of the redundant data processing cores 510-2 and 510-3; if signal $SE_{23}$ is at a low logic level, there is no timing violation occurring in the redundant data processing cores 510-2 and 510-3). The third inverter 578 inverts the signal $SE_{23}$ to generate $\overline{SE}_{23}$.

The signals $M_{12}$ and $\overline{SE}_{12}$ are applied to respective inputs of the first AND-gate 579. The first AND-gate 579 is configured to generate a first enable signal $EN_1$ indicating whether the data outputs OUT-1 and OUT-2 are valid (e.g., If the enable signal $EN_1$ is at a high logic level, the data outputs OUT-1 and OUT-2 are valid; if the enable signal $EN_1$ is at a low logic level, the data outputs OUT-1 and OUT-2 are not valid.).

Similarly, the signals $M_{13}$ and $\overline{SE}_{13}$ are applied to respective inputs of the second AND-gate 580. The second AND-gate 580 is configured to generate a second enable signal $EN_2$ indicating whether the data outputs OUT-1 and OUT-3 are valid (e.g., If the enable signal $EN_2$ is at a high logic level, the data outputs OUT-1 and OUT-3 are valid; if the enable signal $EN_2$ is at a low logic level, the data outputs OUT-1 and OUT-3 are not valid.).

In a like manner, the signals $M_{23}$ and $\overline{SE}_{23}$ are applied to respective inputs of the third AND-gate 581. The third AND-gate 581 is configured to generate a third enable signal $EN_3$ indicating whether the data outputs OUT-2 and OUT-3 are valid (e.g., If the enable signal $EN_3$ is at a high logic level, the data outputs OUT-2 and OUT-3 are valid; if the enable signal $EN_3$ is at a low logic level, the data outputs OUT-2 and OUT-3 are not valid.).

The first, second, and third enable signals $EN_1$, $EN_2$, and $EN_3$ are applied to respective inputs of the decoder 582. The decoder 582 is configured to generate a binary select signal SEL based on the enable signals $EN_1$, $EN_2$, and $EN_3$. For example, the decoder 582 may generate the binary select signal SEL in accordance with the following Table:

| $EN_3$ | $EN_2$ | $EN_1$ | SEL | MUX OUTPUT | ERROR |
|---|---|---|---|---|---|
| 0 | 0 | 0 | 0 | Tristated | 1 |
| 0 | 0 | 1 | 1 | OUT-1 or OUT-2 | 0 |
| 0 | 1 | 0 | 2 | OUT-1 or OUT-3 | 0 |
| 0 | 1 | 1 | N/A | N/A | N/A |
| 1 | 0 | 0 | 3 | OUT-2 or OUT-3 | 0 |
| 1 | 0 | 1 | N/A | N/A | N/A |
| 1 | 1 | 0 | N/A | N/A | N/A |
| 1 | 1 | 1 | 1 or 2 or 3 | OUT-1 or OUT-2 or OUT-3 | 0 |

Thus, according to the Table, if the enable signals $EN_1$, $EN_2$, and $EN_3$ are all at logic low levels because there is no matching data output pair associated with no timing violations, then the decoder 582 outputs the binary select signal SEL with a value of 0. This value causes the output of the multiplexer 583 to be tristated (e.g., present a high impedance). This value also causes the NOR-gate 584 to generate an asserted ERROR signal at a logic high level to indicate that the data outputs OUT-1, OUT-2, and OUT-3 are all invalid.

If the enable signal $EN_1$ is high (e.g., meaning that data outputs OUT-1 and OUT-2 are valid) and the other enable signals $EN_2$ and $EN_3$ are low (e.g., meaning that data output OUT-3 is invalid), the decoder 582 outputs the binary select signal SEL with a value of 1. As the data outputs OUT-1, OUT-2, OUT-3 are applied to respective inputs of the multiplexer 583, the SEL signal at a value of 1 causes the multiplexer 583 to output the data output OUT-1 or OUT-2. The SEL value of 1 also causes the NOR-gate 584 to generate a deasserted ERROR signal at a logic low level to indicate that valid data outputs exist.

If the enable signal $EN_2$ is high (e.g., meaning that data outputs OUT-1 and OUT-3 are valid) and the other enable signals $EN_1$ and $EN_3$ are low (e.g., meaning that data output OUT-2 is invalid), the decoder 582 outputs the binary select signal SEL with a value of 2. The SEL signal at a value of 2 causes the multiplexer 583 to output the data output OUT-1 or OUT-3. The SEL value of 2 also causes the NOR-gate 584 to generate a deasserted ERROR signal at a logic low level to indicate that valid data outputs exist.

If the enable signal $EN_3$ is high (e.g., meaning that data outputs OUT-2 and OUT-3 are valid) and the other enable signals $EN_1$ and $EN_2$ are low (e.g., meaning that data output OUT-1 is invalid), the decoder 582 outputs the binary select signal SEL with a value of 3. The SEL signal at a value of 3 causes the multiplexer 583 to output the data output OUT-2 or OUT-3. The SEL value of 3 also causes the NOR-gate 584 to generate a deasserted ERROR signal at a logic low level to indicate that valid data outputs exist.

If all the enable signals $EN_1$, $EN_2$, and $EN_3$ are high (e.g., meaning that all data outputs OUT-1, OUT-2 and OUT-3 are valid), the decoder 582 outputs the binary select signal SEL at any of the following values 1, 2, or 3. The SEL signal at value 1, 2, or 3 causes the multiplexer 583 to output the data output OUT-1, OUT-2 or OUT-3. The SEL value of 1, 2, or 3 also causes the NOR-gate 584 to generate a deasserted ERROR signal at a logic low level to indicate that valid data outputs exist.

Note, the combination having two asserted enable signals cannot occur. Accordingly, the Table indicates those combinations as non-applicable (N/A).

Figure 6:
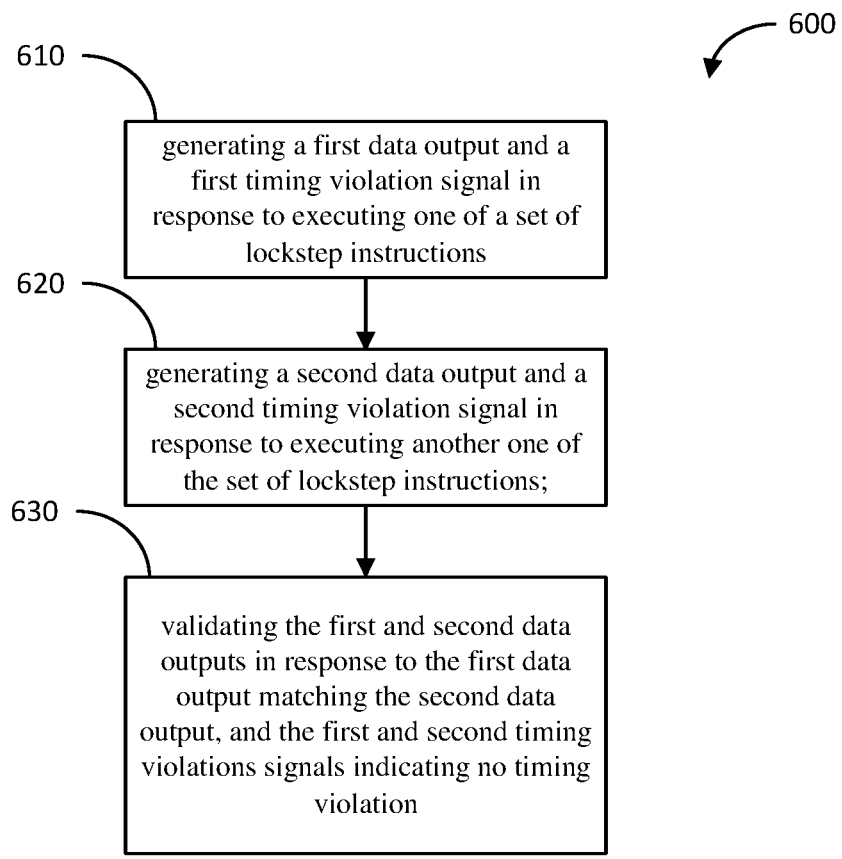
FIG. 6 illustrates a flow diagram of another exemplary method of processing data outputs in accordance with another aspect of the disclosure.

FIG. 6 illustrates a flow diagram of another exemplary method 600 of processing data outputs in accordance with another aspect of the disclosure. The method 600 includes generating a first data output and a first timing violation signal in response to executing one of a set lockstep instructions (block 610). Examples of means for generating a first data output and a first timing violation signal in response to executing one of a set of lockstep instructions include any of the data processing cores 210, 220, 410-1 to 410-N, or 510-1 to 510-3 described herein.

The method 600 further includes generating a second data output and a second timing violation signal in response to executing another one of the set lockstep instructions (block 620). Similarly, examples of means for generating a second data output and a second timing violation signal in response to executing another one of the set of lockstep instructions include any of the data processing cores 210, 220, 410-1 to 410-N, or 510-1 to 510-3 described herein.

The method 600 additionally includes validating the first and second data outputs in response to the first data output matching the second data output, and the first and second timing violations signals indicating no timing violation (block 630). Examples of means for validating the first and second data outputs in response to the first data output matching the second data output, and the first and second timing violations signals indicating no timing violation include any of the voter-comparators 230, 430, or 540 described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
   a first processing core configured to generate a first data output and a first timing violation signal in response to executing one of a set of lockstep instructions;
   a second processing core configured to generate a second data output and a second timing violation signal in response to executing another one of the set of lockstep instructions;
   a voter-comparator configured to validate the first and second data outputs in response to the first data output matching the second data output, and the first and second timing violations signals indicating no timing violation; and
   a responder configured to perform a defined operation based on an asserted error signal generated by the voter-comparator, wherein the defined operation comprises reconfiguring the first and second data processing cores to states prior to the execution of the set of lockstep instructions, respectively.

2. The apparatus of claim 1, wherein the voter-comparator is further configured to invalidate at least one of the first or second data output in response to the first data output not matching the second data output or at least one of the first timing signal or the second timing signal indicating a timing violation.

3. The apparatus of claim 1, wherein the voter-comparator is configured to output at least one of the validated first or second data output.

4. The apparatus of claim 1, wherein the voter-comparator is configured to suppress outputting at least one of the first or second data output if the at least one of the first and second data output is deemed invalid.

5. The apparatus of claim 1, wherein the defined operation comprises stalling the operation of the first and second data processing cores.

6. An apparatus, comprising:
   a first processing core configured to generate a first data output and a first timing violation signal in response to executing one of a set of lockstep instructions;
   a second processing core configured to generate a second data output and a second timing violation signal in response to executing another one of the set of lockstep instructions;
   a voter-comparator configured to validate the first and second data outputs in response to the first data output matching the second data output, and the first and second timing violations signals indicating no timing violation; and
   a responder configured to not respond to a deasserted error signal generated by the voter-comparator.

7. An apparatus, comprising:
   a first processing core configured to generate a first data output and a first timing violation signal in response to executing one of a set of lockstep instructions;
   a second processing core configured to generate a second data output and a second timing violation signal in response to executing another one of the set of lockstep instructions, wherein at least one of the first or second data processing cores comprises a timing violation detection circuit configured to generate the at least first or second timing violation signal; and
   a voter-comparator configured to validate the first and second data outputs in response to the first data output matching the second data output, and the first and second timing violations signals indicating no timing violation.

8. The apparatus of claim 7, wherein the timing violation detection circuit comprises:
   a flip-flop comprising:
      a clock input configured to receive a clock signal;
      a data input configured to receive a first data from a logic circuit; and
      a data output configured to output a second data in response to a triggering portion of the clock signal;
   an inverter configured to generate an inverted clock signal from the clock signal; and
   a comparator comprising:
      a first input configured to receive the first data;
      a second input configured to receive the second data;
      a third input configured to receive the inverted clock signal, wherein the comparator is configured to assert the first or second timing violation signal in response to the first data not matching the second data during a triggering portion of the inverted clock signal.

9. An apparatus, comprising:
   a first processing core configured to generate a first data output and a first timing violation signal in response to executing one of a set of lockstep instructions;

a second processing core configured to generate a second data output and a second timing violation signal in response to executing another one of the set of lockstep instructions, wherein at least one of the first or second data processing core comprises a plurality of timing violation detection circuits configured to generate the at least first or second timing violation signal, wherein the timing violation detections circuits are employed in selected data paths within the at least one of the first or second data processing core, respectively; and a voter-comparator configured to validate the first and second data outputs in response to the first data output matching the second data output, and the first and second timing violations signals indicating no timing violation.

10. A method, comprising:

generating a first data output and a first timing violation signal in response to executing one of a set of lockstep instructions;

generating a second data output and a second timing violation signal in response to executing another one of the set of lockstep instructions;

validating the first and second data outputs in response to the first data output matching the second data output, and the first and second timing violations signals indicating no timing violation; and performing a defined operation in response to invalidating the first and second data outputs, wherein the defined operation comprises reconfiguring the first and second data processing cores to states prior to the execution of the set of lockstep instructions, respectively.

11. The method of claim 10, further comprising invalidating at least one of the first or second data output in response to the first data output not matching the second data output or at least one of the first timing signal or second timing signal indicating a timing violation.

12. The method of claim 10, further comprising outputting at least one of the validated first or second data output.

13. The method of claim 10, further comprising suppressing an outputting of at least one of the first or second data output if the at least one of the first or second data output is deemed invalid.

14. The method of claim 10, wherein the defined operation comprises stalling respective operations of the first and second data processing cores that generated the invalidated first and second data outputs, respectively.

15. The method of claim 10, wherein generating the at least one of the first or second timing violation signal comprises:

receiving a first data;

receiving a second data in response to a first triggering portion of a clock signal;

comparing the first data with the second data in response to a second triggering portion of an inverted clock signal; and asserting the at least first or second timing violation signal in response to the first data not matching the second data based on the comparison.

16. The method of claim 10, wherein generating the at least first or second timing violation signal comprises monitoring for timing violations in selected data paths within the at least first or second data processing core, respectively.

17. An apparatus, comprising:

means for generating a first data output and a first timing violation signal in response to executing one of a set of lockstep instructions;

means for generating a second data output and a second timing violation signal in response to executing another one of the set of lockstep instructions;

means for validating the first and second data outputs in response to the first data output matching the second data output, and the first and second timing violations signals indicating no timing violation; and means for performing a defined operation in response to invalidating the first and second data outputs, wherein the defined operation comprises reconfiguring the first and second data processing cores to states prior to the execution of the set of lockstep instructions, respectively.

18. The apparatus of claim 17, further comprising means for invalidating at least one of the first or second data output in response to the first data output not matching the second data output or at least one of the first timing signal or the second timing signal indicating a timing violation.

19. The apparatus of claim 17, further comprising means for outputting at least one of the validated first or second data output.

20. The apparatus of claim 17, further comprising means for suppressing an outputting of at least one of the first or second data output deemed invalid.

21. The apparatus of claim 17, wherein the defined operation comprises stalling respective operations of first and second data processing cores that generated the invalidated first and second data outputs, respectively.

22. The apparatus of claim 17, wherein the means for generating at least one of the first or second timing violation signal comprises:

means for receiving a first data;

means for receiving a second data in response to a first triggering portion of a clock signal;

means for comparing the first data with the second data in response to a second triggering portion of an inverted clock signal; and means for asserting the at least first or second timing violation signal in response to the first data not matching the second data based on the comparison.

23. The apparatus of claim 17, wherein the means for generating the at least first or second timing violation signal comprises means for monitoring for timing violations in selected data paths within the at least first or second data processing core, respectively.

* * * * *